United States Patent
Han et al.

(10) Patent No.: US 9,071,835 B2
(45) Date of Patent: Jun. 30, 2015

(54) METHOD AND APPARATUS FOR GENERATING MULTIVIEW IMAGE WITH HOLE FILLING

(71) Applicant: SAMSUNG ELECTRONICS CO., LTD., Suwon-si (KR)

(72) Inventors: Seung-ryong Han, Suwon-si (KR); Jong-sul Min, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/867,204

(22) Filed: Apr. 22, 2013

(65) Prior Publication Data

US 2014/0085433 A1  Mar. 27, 2014

(30) Foreign Application Priority Data

Sep. 24, 2012 (KR) .................... 10-2012-0106059

(51) Int. Cl.
*H04N 13/04* (2006.01)
*H04N 13/00* (2006.01)

(52) U.S. Cl.
CPC ....... *H04N 13/0445* (2013.01); *H04N 13/0011* (2013.01); *H04N 13/0404* (2013.01); *H04N 13/0409* (2013.01); *H04N 13/0447* (2013.01)

(58) Field of Classification Search
CPC .................................................. H04N 13/0447
USPC .......................................................... 348/51
See application file for complete search history.

(56) References Cited

U.S. PATENT DOCUMENTS

| 8,270,768 | B2 | 9/2012 | Ernst et al. |
| 2009/0003728 | A1 | 1/2009 | Ernst et al. |
| 2010/0091092 | A1 | 4/2010 | Jeong et al. |
| 2010/0103168 | A1 | 4/2010 | Jung et al. |
| 2010/0104219 | A1 | 4/2010 | Limonov |
| 2010/0194858 | A1 | 8/2010 | Lim et al. |
| 2011/0026809 | A1 | 2/2011 | Jeong et al. |
| 2011/0261050 | A1 | 10/2011 | Smolic et al. |
| 2012/0033872 | A1 | 2/2012 | Cho et al. |

(Continued)

FOREIGN PATENT DOCUMENTS

| KR | 10-2003-0076904 A | 9/2003 |
| KR | 10-2007-0105994 A | 10/2007 |

(Continued)

OTHER PUBLICATIONS

C. Chen, C. Sung, T. Chen, B. Guo, C. Chen, "An Efficient Hole-Filling Approach Using Adaptive Rendering," 2012 6th Int. Conf. on Gen. and Evol. Comp., pp. 336-339, Aug. 25-28, 2012.*

(Continued)

*Primary Examiner* — Richard Torrente
(74) *Attorney, Agent, or Firm* — Sughrue Mion, PLLC

(57) ABSTRACT

A multiview image generating method is provided. The multiview image generating method includes generating a hole image using depth information of an original image, dividing a boundary region in which a hole area of the generated hole image is in contact with a background into at least one patch, selecting an area having the most similar pixel value to a background included in the divided at least one patch, in a preset area of the original image, and filling a hole area on the divided at least one patch with a pixel value of the selected area to generate a first view image.

18 Claims, 14 Drawing Sheets

(56) References Cited

U.S. PATENT DOCUMENTS

| | | |
|---|---|---|
| 2012/0050283 A1 | 3/2012 | Hwang et al. |
| 2012/0128234 A1* | 5/2012 | Kao et al. ............... 382/154 |
| 2012/0169722 A1 | 7/2012 | Hwang et al. |
| 2012/0212480 A1 | 8/2012 | Cho et al. |
| 2013/0127844 A1* | 5/2013 | Koeppel et al. ........... 345/419 |

FOREIGN PATENT DOCUMENTS

| | | | |
|---|---|---|---|
| KR | 10-2008-0059883 A | 7/2008 | |
| KR | 10-2010-0002049 A | 1/2010 | |
| KR | 10-2010-0008649 A | 1/2010 | |
| KR | 10-0950046 B1 | 3/2010 | |
| KR | 10-2010-0040593 A | 4/2010 | |
| KR | 10-0960694 B1 | 6/2010 | |
| KR | 10-2010-0088774 A | 8/2010 | |
| KR | 10-1004758 B1 | 1/2011 | |
| KR | 10-2011-0085469 A | 7/2011 | |
| KR | 10-2012-0012873 A | 2/2012 | |
| KR | 10-2012-0020078 A | 3/2012 | |
| WO | 2012/074294 A2 | 6/2012 | |

OTHER PUBLICATIONS

International Search Report dated Jan. 28, 2014 issued in International Application No. PCT/KR2013/008546 (PCT/ISA/210).
Written Opinion dated Jan. 28, 2014 issued in International Application No. PCT/KR2013/008546 (PCT/ISA/237).

* cited by examiner

FIG. 5A
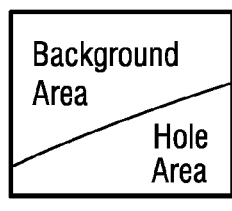
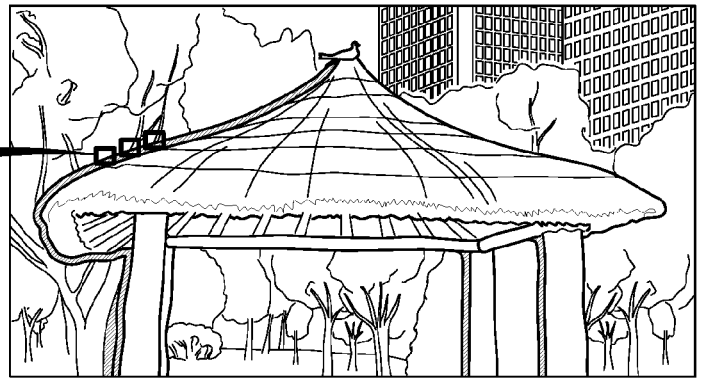
Hole image
FIG. 5B
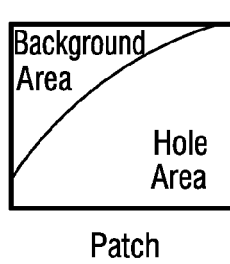
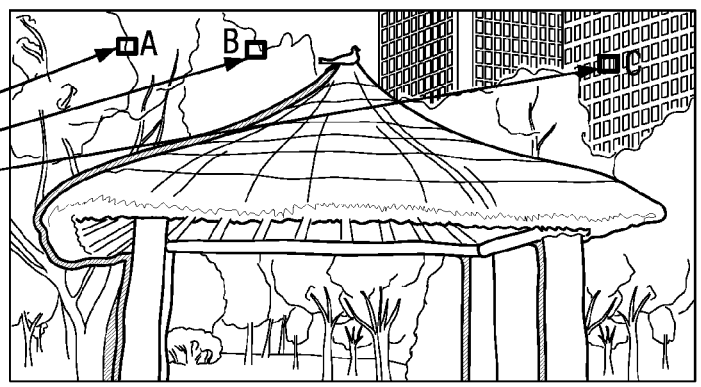
Hole image
FIG. 5C
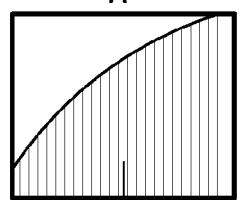
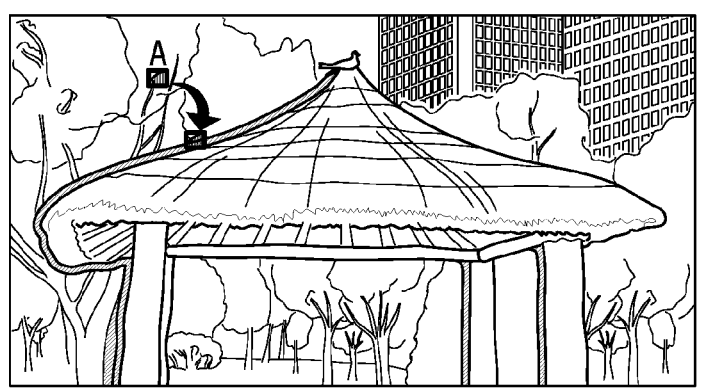
Hole image

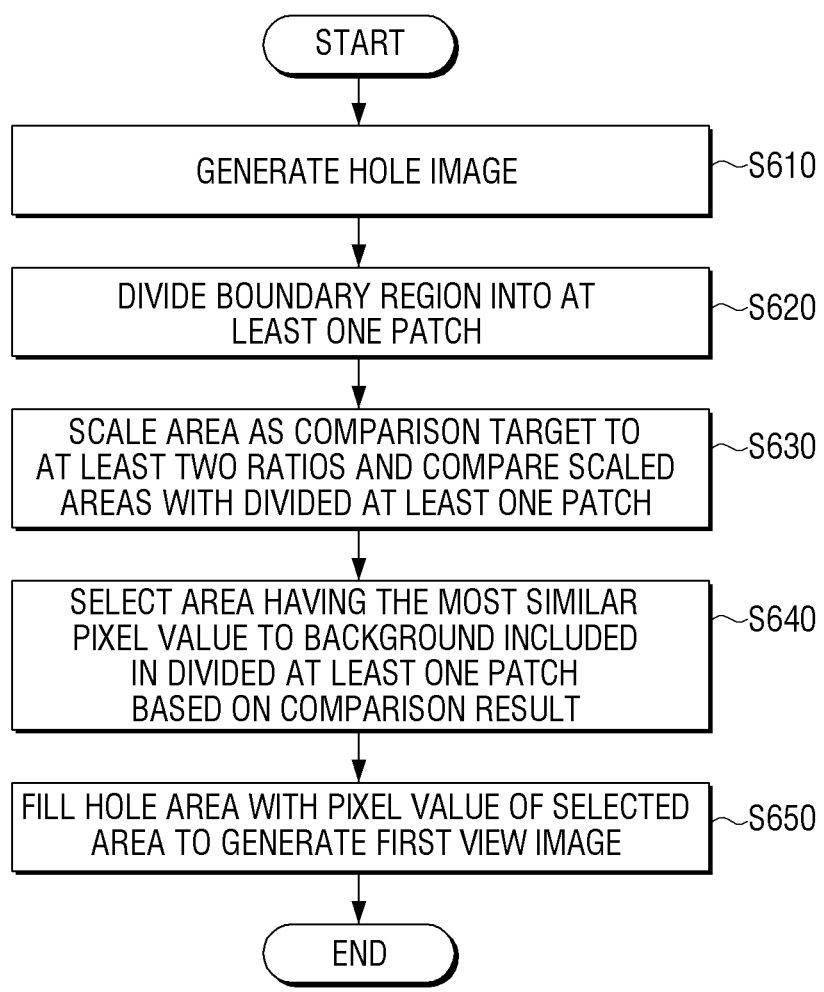

FIG. 7
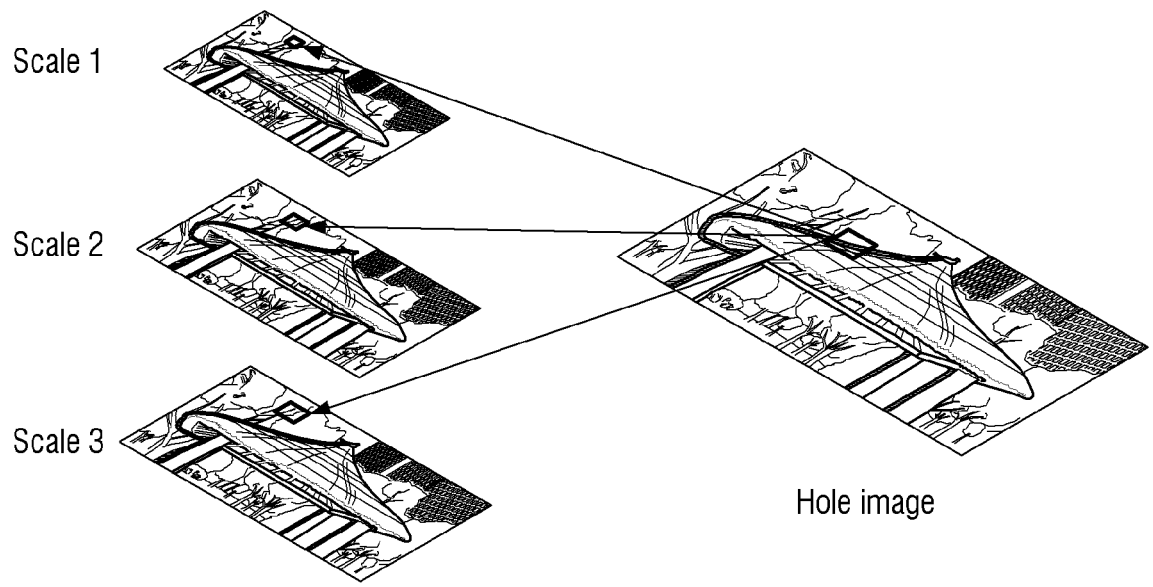
Hole image
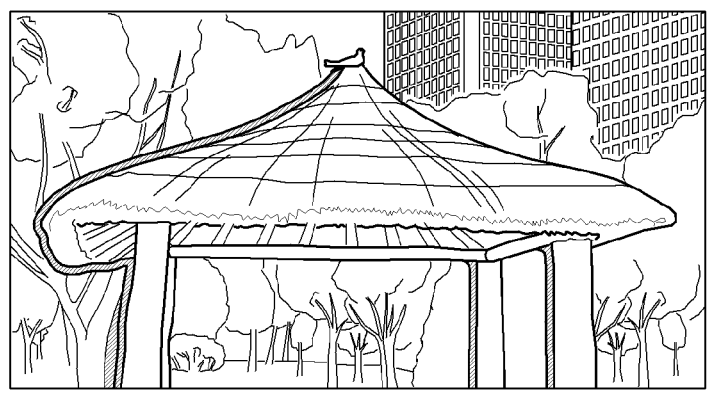
Hole image

METHOD AND APPARATUS FOR GENERATING MULTIVIEW IMAGE WITH HOLE FILLING

CROSS-REFERENCE TO RELATED APPLICATION

This application claims priority from Korean Patent Application No. 10-2012-0106059, filed on Sep. 24, 2012, in the Korean Intellectual Property Office, the disclosure of which is incorporated herein by reference in its entirety.

BACKGROUND

1. Field

Apparatuses and methods consistent with exemplary embodiments relate to a multiview image generating method, and more particularly, to a multiview image generating method and a multiview image display apparatus, which are capable of generating a multiview image by generating a hole image and filling a hole area.

2. Description of the Related Art

With the development of electronic technology, various types of electronic appliances have been developed and spread. In particular, display apparatuses such as televisions (TVs), which are one of the home devices which have been most commonly used in households, have been rapidly developed in recent years.

With high performance of the display apparatuses, the kind of contents displayed in the display apparatuses have been also variously increased. In particular, in recent years, a stereoscopic display system which also can be used to watch three-dimensional (3D) contents has been developed and spread.

The stereoscopic display apparatus may be implemented with various kinds of display apparatuses such as 3D TVs used in the households as well as various kinds of monitors, portable phones, personal digital assistants (PDAs), personal computers (PCs), settop PCs, tablet PCs, digital photo frames, kiosks. Further, 3D display technology may be utilized in the households as well as in various fields which require 3D imaging, such as science, medicine, design, education, advertisement, or computer games.

The stereoscopic display system is largely divided into a glasses-free type system which can watch 3D images without glasses and a glasses type system which can watch 3D images with glasses.

There are shutter glasses type display apparatuses as an example of the glasses type system. The shutter glasses type alternately outputs a left-eye image and a right-eye image and alternately opens/closes left and right shutter glasses of 3D glasses worn by a user, which are interlocked with the left and right-images so that the user can feel a 3D effect.

The glasses-free type system is called an autostereoscopy system. The glasses-free type 3D display apparatuses cause light corresponding to different views of images to be projected to a left-eye and a right-eye of the user using a parallax barrier technique or a lenticular lens while displaying a spatially shifted multiview image so that the user can feel a 3D effect.

The glasses type system can provide a satisfactory 3D effect, but there is inconvenience in that the user has to wear the glasses. On the other hand, the glasses-free type system can allow the user to watch 3D images without glasses and thus development of the glasses-free type system has been consistently discussed.

FIG. 1 is a view illustrating a configuration of a glasses-free type 3D display apparatus in the related art. Referring to FIG. 1, the 3D display apparatus in the related art includes a backlight unit 10, an imaging panel 20, and a parallax unit 30.

The parallax unit 30 may include a slit array of an opaque shield which is known as a parallax barrier or a lenticular lens array. FIG. 1 illustrates a case in which the parallax unit 30 is implemented with the lenticular lens array.

As shown in FIG. 1, the imaging panel 20 includes a plurality of pixels divided into a plurality of columns. Images having different points of view for the columns are arranged. In FIG. 1, an example in which a plurality of images 1, 2, 3 and 4 having different points of view are sequentially alternately arranged is illustrated. That is, the pixel columns are arranged as groups indicated with numbers 1, 2, 3, and 4. Graphic signals applied to the panel are arranged so that the pixel column 1 displays a first image and the pixel column 2 displays a second image.

The backlight unit 10 provides light to the imaging panel 20. By the light provided from the backlight unit 10, the images 1, 2, 3, and 4 formed in the imaging panel 20 are projected to the parallax unit 30 and the parallax unit 30 disperses light of the images 1, 2, 3, and 4 projected and transfers the dispersed light toward a viewer. That is, the parallax unit 30 generates exit pupils at a position of the viewer, that is, at a viewing distance. A thickness and diameter of a lenticular lens when the parallax unit 30 is implemented with the lenticular lens array and a space between slits and the like when the parallax unit 30 is implemented with a parallax barrier may be designed so that the exit pupils generated by each column are separated to an average binocular center distance of below 65 mm. The separated image light forms viewing areas, respectively. That is, as shown in FIG. 1, viewing areas 1, 2, 3, and 4 are formed.

In these conditions, when a left-eye 51 of the user is positioned at the viewing area 3 and a right-eye 52 of the user is positioned at the viewing area 2, the user can feel a 3D effect without specific glasses.

The glasses-free system (hereinafter, referred to as a multiview image generating apparatus) generates a plurality of multiview images from an original image. For example, the multiview image generating apparatus may generate images having nine points of view different from each other from one or more original images.

As one example, there may be a method of generating a hole image having a constant point of view from the original image and interpolating a hole area. The multiview image generating method is disclosed in Korean Patent Laid-open Publication No. 20100040593 and 20110085469.

However, the hole area interpolation method in the related art is merely a method of simply filling a hole area with a pixel value of a background adjacent thereto in units of horizontal lines or reducing a size of the hole. In this case, an image of a portion corresponding to a hole area of an actually generated multiview image is often distorted. In particular, when a depth is relatively high like a case in which a background around the hole area is an area structurally protruding in the image, the distortion of the image is serious. Therefore, there is a need for a method of generating a smooth multiview image by effectively processing a portion forming a structure in the original image.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments are to provide a multiview image generating method and a multiview image display apparatus which are capable of generating a smooth multiview image by effectively processing a portion forming a structure in an original image.

According to an aspect of an exemplary embodiment, there is provided a multiview image generating method. The multiview image generating method may comprise: generating a hole image using depth information of an original image; dividing a boundary region in which a hole area of the generated hole image is in contact with a background into at least one patch; selecting an area having a most similar pixel value to a background included in the divided at least one patch, from an area of the original image; and filling the hole area on the divided at least one patch with a pixel value of the selected area to generate a first view image. The area of the original image may be preset.

The selecting may comprise scaling an area which is a comparison target in the area of the original image to at least two ratios and comparing the scaled areas with the divided at least one patch, and selecting the area having the most similar pixel value to the background portion included in the divided at least one patch based on a comparison result.

The multiview image generating method may further comprise generating a first hole image using the depth information of the original image, generating a second hole image using depth information of the generated first view image, and generating a second view image by one from among: filling a hole area of the first hole image with a pixel value of an area of the second hole image corresponding to the hole area of the first hole image and filling a hole area of the second hole image with the pixel value of the area of the first hole image corresponding to the hole area of the second hole image.

The generating a hole image may include generating the hole image by shifting pixels by distances according to levels of depths of the pixels of the original image. The pixels may be shifted preset distances.

The selecting may be performed on a patch having a large difference in pixel values between the hole area and the background portion in the divided at least one patch.

The selecting may comprise determining a degree of similarity by comparing a color, depth, and gradient of each portion in the area of the original image with corresponding characteristics of the background portion included in the divided at least one patch.

The multiview image generating method may generate the first view image by repeatedly performing a process from the generating the hole image to the filling a hole area until hole areas of the hole image are completely filled.

The multiview image generating method may further comprise generating a multiview image by combining pixels of areas of the first view image and the second view image, which correspond to each other.

According to another aspect of an exemplary embodiment, there is provided a multiview image display apparatus. The multiview image display apparatus may comprise: a reception unit configured to receive an original image; a controller which includes a hole image generator configured to generate a hole image using depth information of the original image, a similar area selector configured to divide a boundary region in which a hole area of the generated hole image is in contact with a background, into at least one patch, and select an area having a most similar pixel value to a background portion included in the divided at least one patch, in an area of the original image, and an image generator configured to fill a hole area on the divided at least one patch with a pixel value of the selected area to generate a first view image; and a display panel configured to output the generated first view image. The area of the original image may be preset.

The similar area selector may scale an area which is a comparison target in the area of the original image to at least two ratios, compare the scaled areas with the divided at least one patch, and select the area having the most similar pixel value to the background portion included in the divided at least one patch based on a comparison result.

The hole image generator may generate a first hole image using the depth information of the original image and further generate a second hole image using depth information of the generated first view image and the image generator may generate a second view image by one from among: filling a hole area of the first hole image with a pixel value of an area of the second hole image corresponding to the hole area of the first hole image and filling a hole area of the second hole image with a pixel value of an area of the first hole image corresponding to the hole area of the second hole image.

The hole image generator may generate the hole image by shifting pixels by distances according to levels of depths of the pixels of the original image. The pixels having larger levels of depths are shifted further than pixels having smaller levels of depths.

The similar area selector may perform the selection operation on a patch having a large difference in pixel values between the hole area and the background portion in the divided at least one patch.

The similar area selector may determine a degree of similarity by comparing a color, depth, and gradient of each portion in the area of the original image with those of the background portion included in the divided at least one patch.

The similar area selector and the image generator may generate the first view image by repeatedly performing the selection operation and the filling operation until hole areas of the hole image are completely filled.

The controller may further include a multiview image generator configured to generate a multiview image by combining pixels of areas in the first view image and the second view image, which are corresponding to each other.

According to the above-described various exemplary embodiments, a portion forming a structure in an original image is effectively processed to generate a smooth multiview image.

Additional aspects and advantages of the exemplary embodiments will be set forth in the detailed description, will be obvious from the detailed description, or may be learned by practicing the exemplary embodiments.

BRIEF DESCRIPTION OF THE DRAWING FIGURES

The above and/or other aspects will be more apparent by describing in detail exemplary embodiments, with reference to the accompanying drawings, in which:

FIGS. 5A-5C are views explaining a method of filling a hole image with an area of an original image similar to a patch;

FIG. 6 is a flowchart illustrating a multiview image generating method according to another exemplary embodiment;

FIG. 7 is a view explaining a method of determining a portion having a high degree of similarity by the method of FIG. 6;

DETAILED DESCRIPTION OF THE EXEMPLARY EMBODIMENTS

Figure 1:
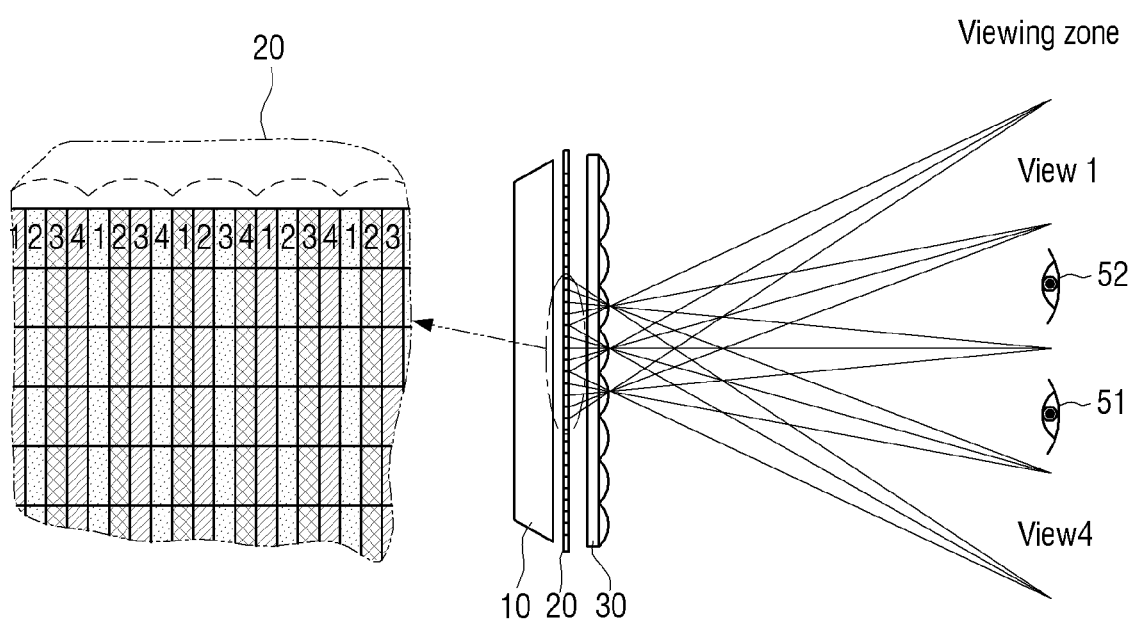
FIG. 1 is a block diagram illustrating a configuration of a glasses-free type 3D display apparatus in the related art.

Hereinafter, exemplary embodiments will be described in more detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

Figure 2:
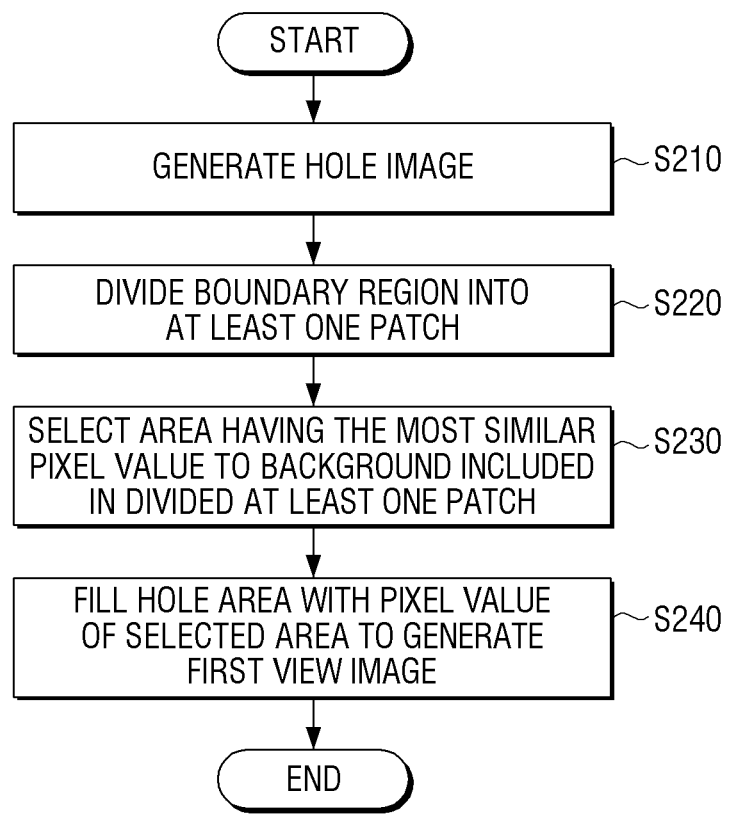
FIG. 2 is a flowchart illustrating a multiview image generating method according to an exemplary embodiment.
Figure 3:
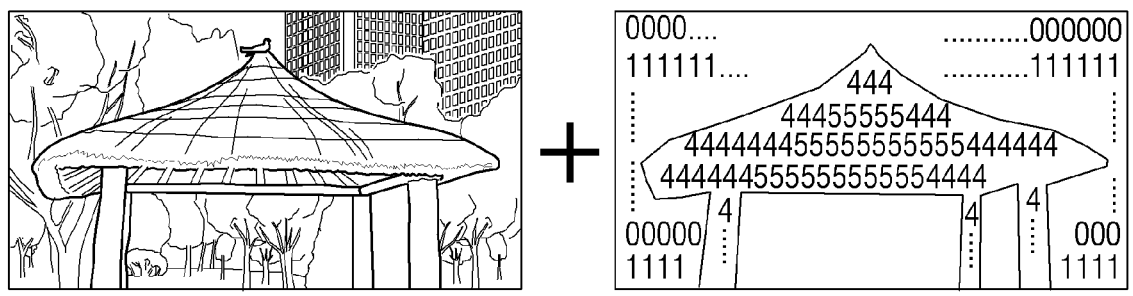
FIG. 3 is a view explaining an original image for generating a hole image.
Figure 4:
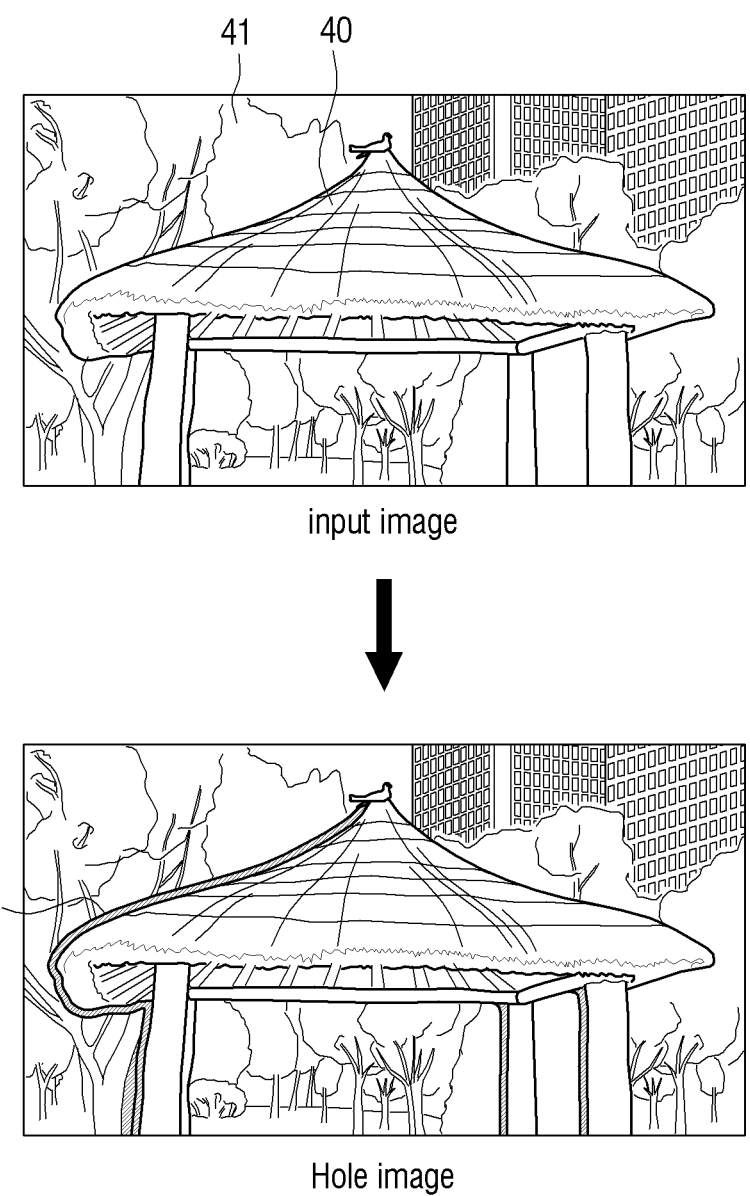
FIG. 4 is a view illustrating a generated hole image.

FIG. 2 is a flowchart illustrating a multiview image generating method according to an exemplary embodiment, FIG. 3 is a view explaining an original image for generating a hole image, FIG. 4 is a view illustrating a generated hole image, and FIG. 5 is a view illustrating a method of filling a hole area with an area of the original image similar to a patch.

Referring to FIG. 2, the multiview image generating method according to an exemplary embodiment includes generating a hole image (S210), dividing a boundary region into at least one patch (S220), selecting the most similar area to a background included in the patch in an original image (S230), and filling a hole area to generate a first view image (S240).

First, the generating a hole image (S210) is a process of generating the hole image using depth information of the original image.

Here, the original image may have various types. For example, the original image may include a left-eye image and a right-eye image having disparity between pixels. In this case, the original image is a depth of two. On other hand, the original image may be a depth of one and a depth map representing depth information is used to generate the hole image.

The depth information, which is information indicating a depth of a 3D image, is information corresponding to a degree of binocular disparity between a left-eye image frame and a right-eye image frame. The degree of a 3D effect that users feel is changed according to the depth information. That is, when the depth is large, since the binocular disparity is high, the users feel a relatively high 3D effect. When the depth is small, since the binocular disparity is low, the users feel a relatively low 3D effect. The depth information may be represented using a depth map to be described later.

The depth map denotes a table including depth information for respective areas of a display screen. The area may be divided in units of pixels and may be defined as a preset area larger than the pixel units. At this time, the depth information may be a depth for each area or each pixel of a 3D image frame. In one exemplary embodiment, the depth map may correspond to a 2D image of a gray scale indicating a depth for each pixel of an image frame.

FIG. 3 illustrates an example of an original image and a depth map corresponding to the original image. It can be seen that the original image includes a pavilion which is an object located at the most forward position of the image, and trees and buildings are located behind the pavilion. The pavilion is the object located at the most forward position and has a large depth, while the trees and buildings have a small depth and thus constitute a background of the image. Therefore, in the depth map of the image, the pavilion has a large depth value, while the background behind the pavilion has a small depth.

Hereinafter, a method of generating a hole image using the original image and the depth map will be described.

According to an exemplary embodiment, the hole image may be generated by shifting pixels by preset distances according to levels of the depths for the pixels of the original image.

It is assumed that an image having a left point of view is generated based on the original image. The image having the left point of view is the same as an image obtained by rotating the original image by a constant angle to the left based on the center of the original image. When the image is projected onto a 2D plane, objects have to move by a distance corresponding to the constant angle to the right. At this case, close objects move a long distance, while distant objects or a background move a relatively short distance. Therefore, a multiview image is generated.

At this time, the above-described depth map is used. That is, since a pixel having a large depth is regarded as an object closely located with reference to the depth map, the pixel having the large depth is shifted by a relatively long distance. On the other hand, since a pixel having a small depth is regarded as a distant object or a background, the pixel having the small depth is shifted by a relatively short distance.

Since the shifted distances of the pixels constituting the object are changed according to the levels of the depths, pixels in the original image do not move, which causes a portion that is not filled, to be generated. The portion is referred to as a hole area and an image having a hole area is referred to as the hole image.

FIG. 4 illustrates the hole image generated as described above. That is, when an original image illustrated in an upper image is shifted to the right with respect to pixels with reference to the depth map, a hole image illustrated in the lower image is generated.

When the hole image is generated, a boundary region is divided into at least one patch (S220). That is, the boundary region in which a hole region 42 of the generated hole image is in contact with a background 41 is divided into at least one patch.

Referring to FIG. 5(a), there is a hole area on a roof of the pavilion which is a close object of the original image. A boundary region in which the hole area is in contact with a background is divided into a plurality of patches. Each patch is divided into a background area and a hole area.

An area having the most similar pixel value to the background included in the divided at least one patch in a preset area of the original image (S230) is selected. That is, the area having the most similar pixel value to the background area in the original image is determined.

In FIG. 5(b), the patch is compared with areas A, B, and C of the original image. Then, the area A having the most similar pixel value may be selected (see FIG. 5(c)).

In an exemplary embodiment, the selection process may be performed by comparing a color, depth, and gradient of each portion in the preset area of the original image with those in the background included in the divided at least one patch, and determining the degree of similarity.

For example, the color of the background may be represented with RGB and in this case, all RGB values for pixels of the at least one patch may be added, all RGB values of pixels in any portion in the preset area of the original image corresponding thereto may be added, and two added values may be compared. A portion having the smallest difference between the two added values in the preset area of the original image may be selected.

Similarly, all depth values for the pixels of the at least one patch may be added, all depth values of the pixels of any portion in the preset area of the original image corresponding thereto may be added, and two added values may be compared. A portion having the smallest difference between the two added values in the preset area of the original image may be selected.

Further, all gradient values for the pixels of the at least one patch may be added, all gradient values of the pixels of any portion in the preset area of the original image corresponding thereto may be added, and two added values may be compared. A portion having the smallest difference between the two added values in the preset area of the original image may be selected.

The portion in the preset area of the original image may be compared with the background included in the divided at least one patch using any one of the color value, the depth value, and the gradient value, but all the color value, depth value, and gradient value may be compared. In this case, accuracy is improved by considering information which can not be confirmed through only one factor. For example, a pattern of color which can not be confirmed based on only a difference between added values of all pixel values, may be also considered.

When the most similar portion of the preset area of the original image to the patch is determined, the hole area is filled using the portion to generate the first view image (S240). That is, the hole area on the divided at least one patch is filled with the pixel value of the selected area to generate the first view image.

Referring to FIG. 5(c), an area A which is the most similar area to the patch is selected and the hole area of the patch is filled with a pixel value of an area in the area A corresponding to the hole area.

The hole area interpolation method in the related art is merely a method of simply filling a hole area with a pixel value of a background adjacent to the hole area in units of horizontal lines or reducing a size of the hole. In this case, an image of a portion corresponding to a hole area in an actually generated multiview image is often distorted. In particular, when a depth of a neighboring background area is relatively high like a case in which a background around the hole area is an area structurally protruding in the image, the distortion of the image is significant.

However, as described above, the exemplary embodiment solve the problem by dividing the boundary region between the hole area and the background into at least one patch, filling the hole area with corresponding pixels of the portion in the original image, which is the most similar to each patch. In this case, the portion forming a structure in the original image is not simply filled with the pixels of the background adjacent thereto but filled using the most similar image to generate a smooth multiview image.

However, in general, since the above-described patch is a small portion in the whole image, there may be many cases in which many distinguishable pieces of information are not included in the patch and there may be a plurality of similar portions in the original image. Therefore, there is a need for a method of determining a portion having a higher degree of similarity to the background area of the patch among the plurality of similar portions.

Hereinafter, the method will be described.

FIG. 6 is a flowchart illustrating a multiview image generating method according to another exemplary embodiment and FIG. 7 is a view explaining a method of determining a portion having a high degree of similarity through the method of FIG. 6.

Referring to FIG. 6, the multiview image generating method according to another exemplary embodiment includes generating a hole image (S610), dividing a boundary region into at least one patch (S620), scaling an area which is a comparison target and comparing the scaled areas with the patch (S630), selecting an area of an original image most similar to a background included in the patch based on a comparison result (S640), and filling a hole image to generate a first view image (S650).

Steps S610, S620, and S650 are the same as steps S210, S220, and S240 in the above-described exemplary embodiment and thus repetitive description thereof will be omitted.

In the exemplary embodiment, when the boundary region is divided into the at least one patch (S620), the area, which is the comparison target, in a preset area of the original image is scaled to at least two ratios and the scaled areas are compared with the divided at least one patch (S630).

Here, the scaling means to multiply an integer to a distribution range of a pixel value so that the distribution range becomes within a preset range. A case in which the preset range is more than a distribution range of a pixel value of original image data is referred to as up-scaling and as the up-scaling result, a screen of the image data is magnified to a preset ratio. On the other hand, a case in which the preset range is less than a distribution range of a pixel value of input image data is referred to as down-scaling and as the down-scaling result, a screen of the image data is reduced to a preset ratio. In the up-scaling, one pixel value on the input image data may match a plurality of pixel values of the image data screen as a scaling result and thus a resolution may be degraded.

As illustrated in FIG. 7, the area of the original image, which is the comparison target, may be scaled to three ratios to be magnified or to be reduced. The images scaled to three ratios are compared with the divided at least one patch, respectively.

As described above, since the patch is a very small portion in the whole image, there may be a plurality of similar portions to the patch in the original image. The exemplary embodiment compares the portions of the images which are scaled to various ratios with the patch to determine a portion having the higher degree of similarity to the background area of the patch among the plurality of similar portions.

Based on the comparison result, the area having the most similar pixel value to the background included in the divided at least one patch is selected (S650). The method of determining the degree of similarity has been described above and thus repetitive description thereof will be omitted.

According to the above-described exemplary embodiment, a hole image is generated through one original image, a hole area of the hole image is divided into patches, and the hole area is filled with an image having a high degree of similarity in the original image so that the distortion-free natural multiview image is generated.

The final multiview image may be configured of images for a plurality of points of view. The images may be generated through the above-described method. Merely, when the number of individual images is increased, an amount of operation may be increased. In this case, the following effective multiview image generating method may be considered.

Figure 8:
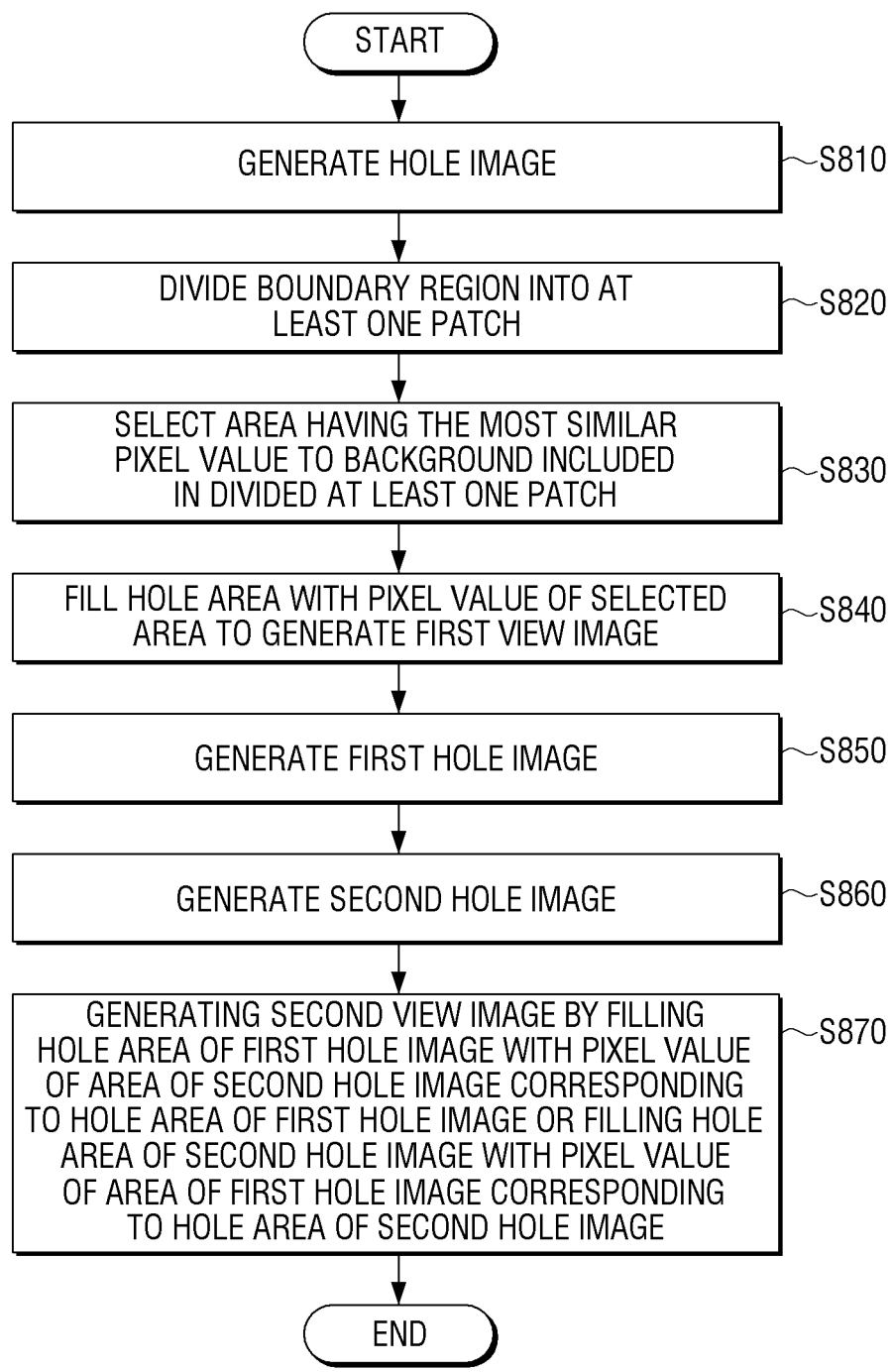
FIG. 8 is a flowchart illustrating a multiview image generating method according to another exemplary embodiment.
Figure 9:
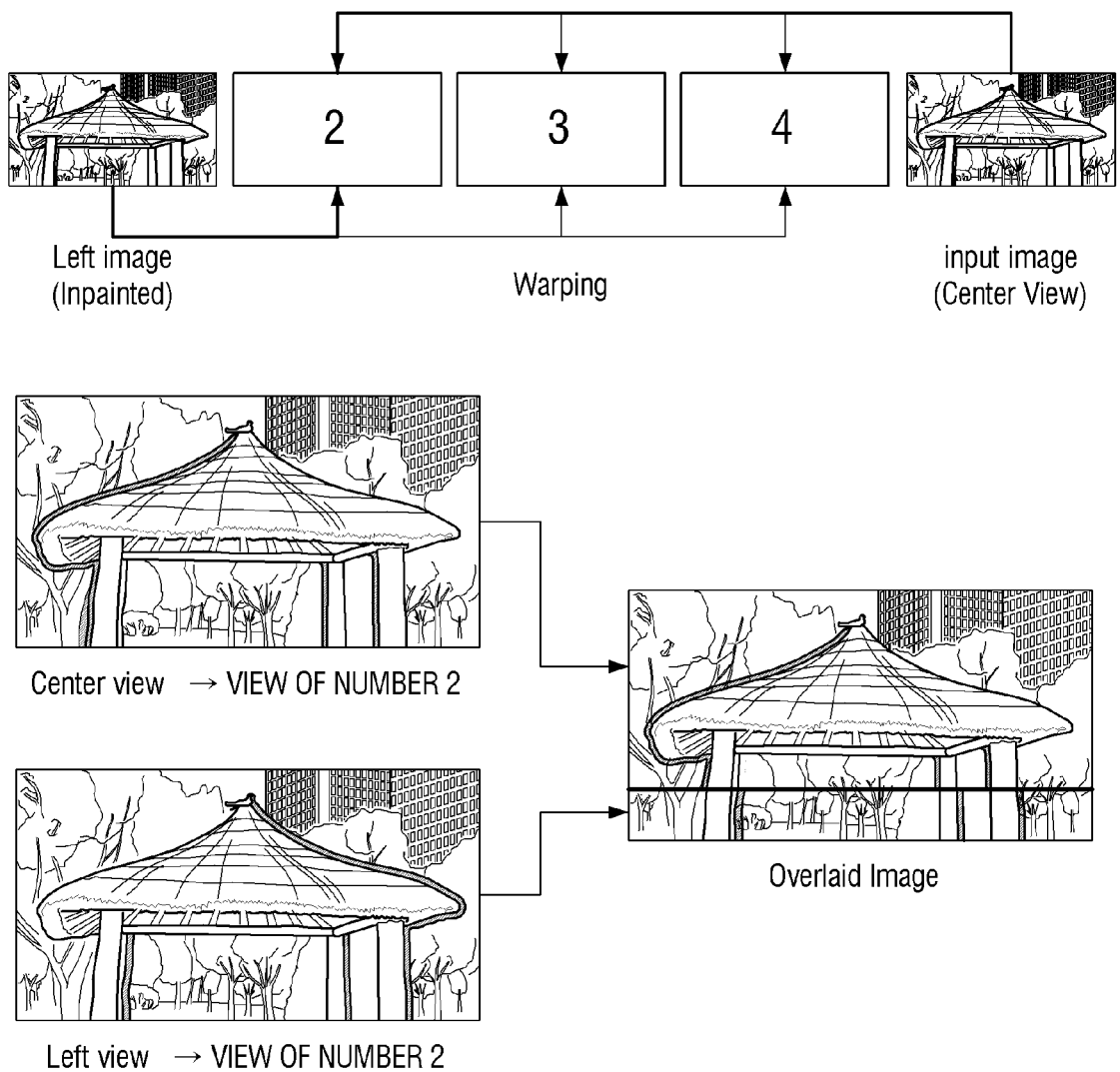
FIG. 9 is a view illustrating a method of generating a multiview image according to the method of FIG. 8.

FIG. 8 is a flowchart illustrating a multiview image generating method according to another exemplary embodiment and FIG. 9 is a view explaining a method of generating a multiview image according to the method of FIG. 8.

Referring to FIG. 8, the multiview image generating method according to another exemplary embodiment may include generating a hole image (S810), dividing a boundary region into at least one patch (S820), selecting an area of an original image most similar to a background included in the patch (S830), filling a hole area to generate a first view image (S840), generating a first hole image (S850), generating a second hole image (S860), and generating a second view image (S870).

Steps S810, S820, S830, and S840 are the same as steps S210, S220, S230, and S240 in the above-described exemplary embodiment and thus repetitive description thereof will be omitted.

In the exemplary embodiment, when the first view image is generated, an image having a point of view between the first view image and the original image may be generated. That is, the first hole image having the point of view between the first view image and the original image is generated using depth information of the original image (S850). The first hole image is generated through the same method as the method of generating the hole image described above.

The second hole image having the same point of view as the first hole image is generated using depth information of the generated first view image (S860).

At this time, the first hole image is an image of which the point of view is shifted to a first direction on the basis of the original image, while the second hole image is an image of which the point of view is shifted to the second direction different from the first direction on the basis of the first view image. Therefore, the hole areas of the first hole image and second hole image are generated in the different directions from each other.

Referring to FIG. 9 of the exemplary embodiment, when a hole image is generated from the left image to generate a view image of number 2, it can be that a hole image in which a hole area is generated in the right side of an object is generated. On the other hand, when a hole image is generated from the right image (original image) to generate the view image of number 2, it can be that a hole image in which a hole area is generated in the left side of the object is generated.

After two hole images are generated, the second view image is generated by filling the hole area of the first hole image with a pixel value of an area of the second hole image corresponding to the hole area of the first hole image or filling the hole area of the second hole image with a pixel value of an area of the first hole image corresponding to the hole area of the second hole image (S870).

Since the first hole image and the second hole image are images having different hole areas from each other with the respect to the same point of view, an area of the second hole image having a pixel value corresponding to the hole area of the first hole image is present and similarly, an area of the first hole image having a pixel value corresponding to the hole area of the second hole image is present. Therefore, the hole areas may be filled using the pixel values of the areas of the different hole images corresponding to each other.

In FIG. 9, the hole image having the hole area in the left side of the object may be filled with a pixel value of the area of another hole image corresponding to thereto. Similarly, the hole image having the hole area in the right side of the object may be filled with a pixel value of the area of another hole image corresponding to thereto. An upper side and lower side of the overlaid image of FIG. 9 represent images having different hole areas from each other.

When an image having a point of view, which exists between two different points of views, is generated from images having the two different points of view, two hole images are generated and a hole area of one hole image may be filled with a pixel value of another hole image corresponding to the hole area of the one hole image. Therefore, when the number of individual images is increased, the multiview image can be generated rapidly and effectively.

Figure 10:
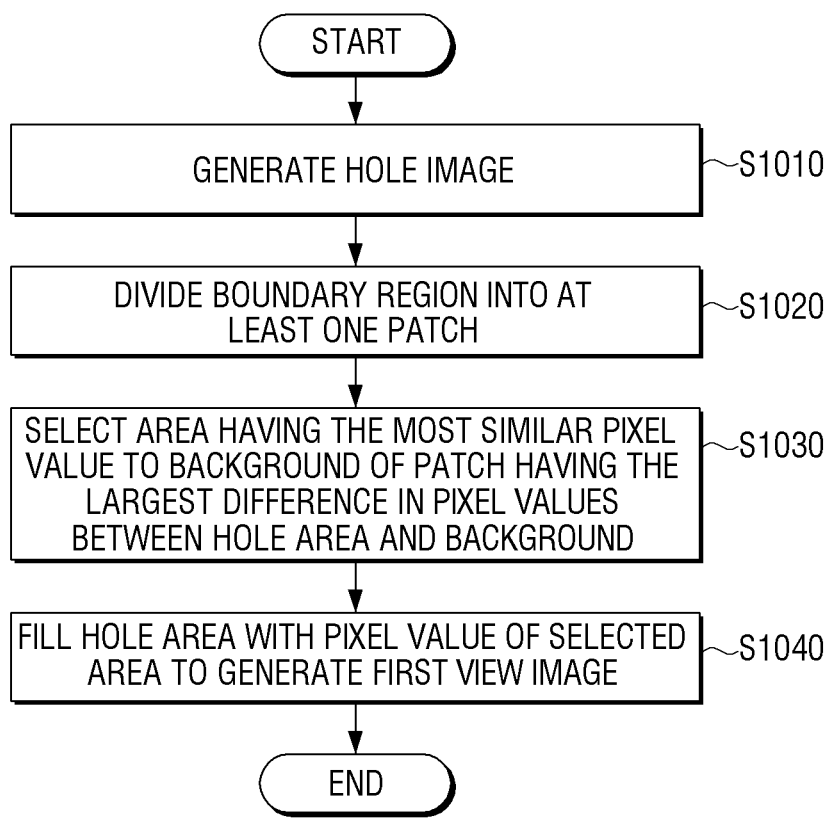
FIG. 10 is a flowchart illustrating a multiview image generating method according to another exemplary embodiment.

On the other hand, in the above-described exemplary embodiments, the issue of whether a step of selecting which patch among a plurality of patches, is preferentially performed may be caused. FIG. 10 is a flowchart illustrating a multiview image generating method for solving the issue.

Referring to FIG. 10, the multiview image generating method according to another exemplary embodiment may include generating a hole image (S1010), dividing a boundary region into at least one patch (S1020), selecting an area of an original image the most similar to a background included in the patch (S1030), and filling a hole area to generate a first view image (S1040).

Steps S1010, S1020, S1030, and S1040 are the same as steps S210, S220, S230, and S240 in the above-described exemplary embodiment and thus repetitive description thereof will be omitted.

In step S1030, the step of selecting may be preferentially performed on a patch having a large difference in pixel values between the hole area and the background in the divided at least one patch.

When the difference in the pixel values between the hole area and the background adjacent to the hole area in the at least one patch is large, in most cases, the adjacent background forms a structure in an image or the patch has pixels having large depths. Therefore, the area of the original image similar to the patch is selected by assigning priority to the patch to generate a more natural and effective multiview image.

Figure 11:
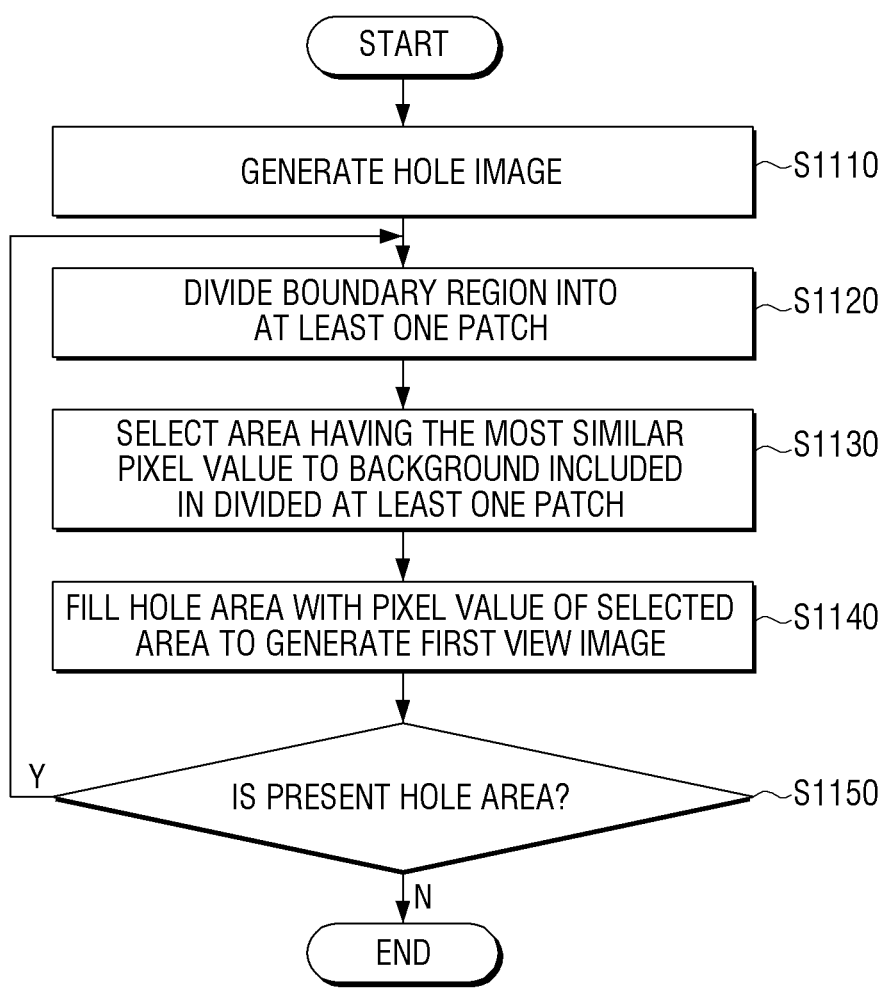
FIG. 11 is a flowchart illustrating a method of generating a complete first view image according to another exemplary embodiment.

FIG. 11 is a flowchart illustrating a method of generating a complete first view image according to another exemplary embodiment.

Steps according to the above-described exemplary embodiments are repeated until all hole areas of the hole image are filled. That is, a process of filling a hole area with a similar portion of the original image with respect to any one patch is completed, the above-described process is repeatedly performed on the boundary regions of the remaining hole areas. The above-described processes are continuously performed until the hole areas are removed.

The process of generating the complete first view image will be described with reference to FIG. 11. First, a hole image is generated (S1110), a boundary region is divided into at least one patch (S1120), and an area having the most similar pixel value to a background included in the divided at least one patch is selected (S1130). Then, a first view image is generated by filling the hole area with the pixel value of the selected area (S1140). Steps are continuously performed until the complete first view image is generated by filling and removing all the hole areas (S1150).

Figure 12:
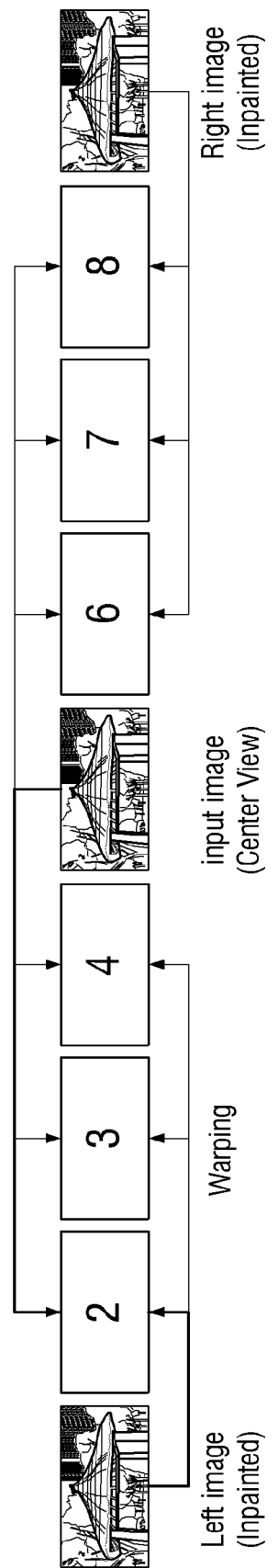
FIG. 12 is a view illustrating a method of generating a complete multiview image according to another exemplary embodiment.

FIG. 12 is a view explaining a method of generating a complete multiview image according to another exemplary embodiment.

The multiview image generating method according to another exemplary embodiment may include steps S810 to S860 described above and further include generating a multiview image by combining pixels of areas of the first view image and the second view image, which are corresponding to each other.

According to the various exemplary embodiments, first, an image (any one of a left image and a right image of FIG. 12) having the outermost point of view is generated from an original image through steps S810 to S840 and an image having a point of view between the original image and the image having the outermost point of view is generated through steps S850 to S870.

A program for executing the methods according to the above-described various exemplary embodiments may be stored and used in various types of recording media.

Specifically, a code for executing the above-described methods may be stored in various types of non-transitory terminal-readable media such as random access memories (RAMs), flash memories, read only memories (ROMS), erasable programmable ROMs (EPROMs), electronically erasable and programmable ROMs (EEPROMs), registers, hard discs (HDs), removable discs, memory cards, universal serial bus (USB) memories, or compact disc-ROMs (CD-ROMs).

Hereinafter, multiview image display apparatuses 100 and 100' which perform the above-described methods will be described.

Figure 13:
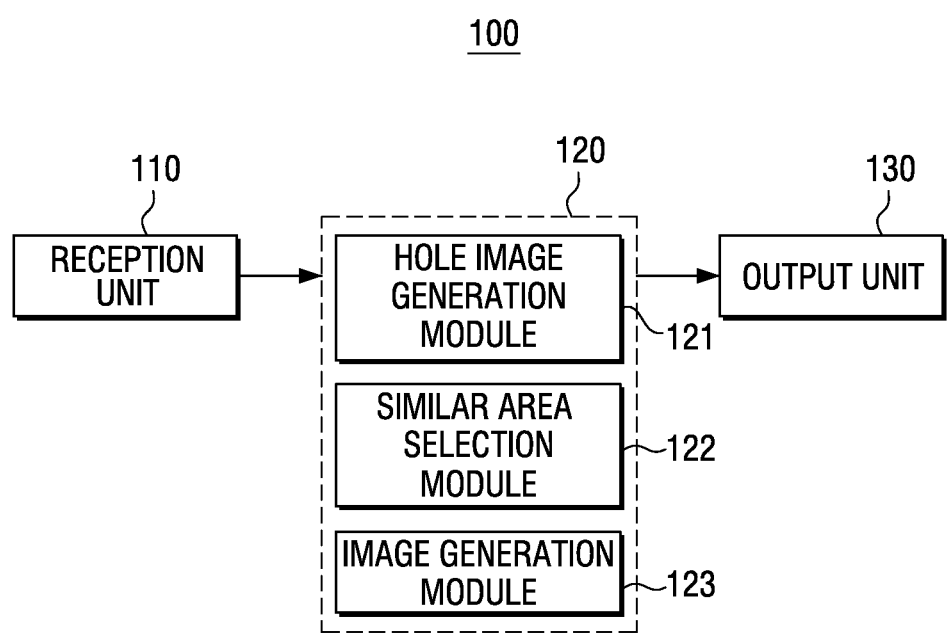
FIGS. 13 and 14 are block diagrams illustrating multiview image display apparatuses according to various exemplary embodiments.
Figure 14:
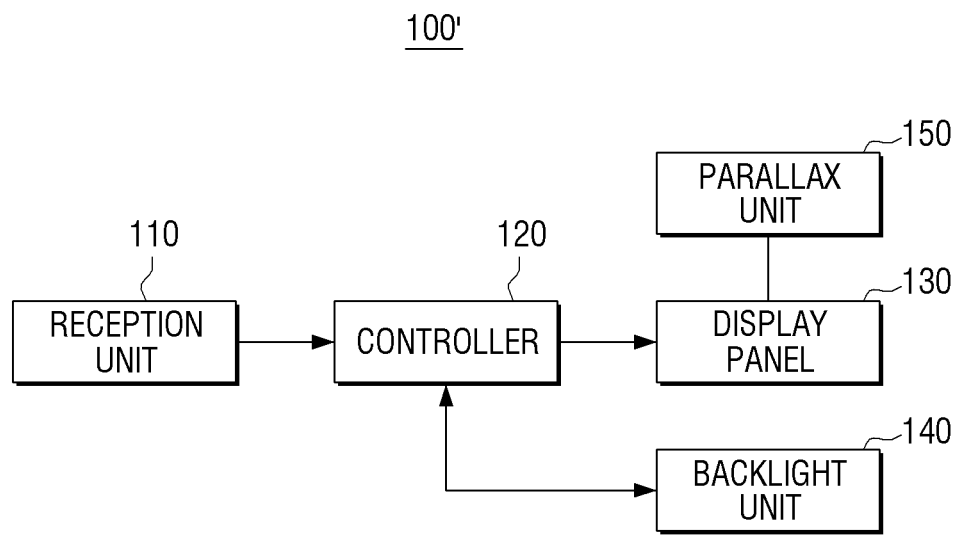

FIGS. 13 and 14 are block diagrams illustrating configurations of the multiview image display apparatuses 100 and 100' according to various exemplary embodiments.

Referring to FIG. 13, the multiview image display apparatus 100 according to the various exemplary embodiments includes a reception unit 110 configured to receive an original image, a controller 120 including a hole image generation module 121, a similar area selection module 122, and an image generation module 123, and an output unit 130 configured to output a generated first view image. The hole image generation module 121 generates a hole image using depth information of the original image. The similar area selection module 122 divides a boundary region in which a hole area of the generated hole image is in contact with a background into at least one patch and selects an area having the most similar pixel value to a background included in the divided at least one patch, in a preset area of the original image. The image generation module 123 fills a hole area on the divided at least one patch with the pixel value of the selected area to generate the first view image.

The reception unit 110 receives a content including an image. Specifically, the reception unit 110 receives the content from a broadcasting station which transmits a broadcasting program content using a broadcasting network or from a web server which transmits a content file using Internet. Alternatively, the reception unit 110 may receive the content from various kinds of recording medium reproducing apparatuses which are provided in the multiview image display apparatus 100 or are connected to the multiview image display apparatus 100. Here, the recording medium reproducing apparatus means an apparatus configured to reproduce a content stored in various types of recording media such as CDs, digital versatile discs (DVDs), HDs, blu-ray discs, memory cards, or USB memories.

When the content is received from a broadcasting station in an exemplary embodiment, the reception unit 110 may be implemented to include a configuration such as a tuner (not shown), a demodulator (not shown), or an equalizer (not shown). When the content is received from a source such as a web server in another exemplary embodiment, the reception unit 110 may be implanted with a network interface card (not shown). Alternatively, the content is received from the above-described various kinds of recording medium reproducing apparatuses in still another exemplary embodiment, the reception unit 110 may be implemented with an interface unit (not shown) connected to the recording medium reproducing apparatus. For example, the reception unit 110 may be implemented with an audio/video (AV) terminal, a composite (COMP) terminal, a high-definition multimedia interface (HDMI) terminal, and the like. In addition, the reception unit 110 may be implemented in various types according to various exemplary embodiments.

The controller 120 controls an overall operation of the multiview image display apparatus 100, in particular, generation of the multiview image. As described above, the controller 120 includes the hole image generation module 121, the similar area selection module 122, and the image generation module 123.

In an exemplary embodiment, the similar area selection module 122 may scale an area, which is a comparison target in a preset area of the original image, to at least two ratios, compare the scaled areas with the divided at least one patch, and select an area having the most similar pixel value to a background included in the divided at least one patch based on a comparison result.

In another exemplary embodiment, the hole image generation module 121 may further generate a first hole image using depth information of the original image and further generate a second hole image using the depth information of the generated first view image, in addition to the above-described hole image. At this time, the image generation module 123 may further generate a second view image by filling a hole area of the first hole image with a pixel value of an area of the second hole image corresponding to the area of the hole first image or filling the hole area of the second hole image with a pixel value of an area of the first hole image corresponding to the area of the second hole image, in addition to the first view image.

In another exemplary embodiment, the hole image generation module 121 may generate the hole image by shifting pixels by preset distances according to the levels of the depths for the pixels of the original image.

In another exemplary embodiment, the similar area selection module 122 may preferentially perform the selection operation on a patch having a large difference in pixel values between the hole area and the background in the divided at least one patch.

In another exemplary embodiment, the similar area selection module 122 may determine a degree of similarity by comparing a color, depth, and a gradient of each portion in the preset area of the original image and those of the background included in the divided at least one patch.

In another exemplary embodiment, the similar area selection module 122 and the image generation module 123 may generate the first view image by repeating the process until the hole areas of the hole image are filled.

In another exemplary embodiment, the controller 120 may further include a multiview image generation module configured to generate a multiview image by combining pixels of areas of the first view image and the second view image corresponding to each other.

The output unit is configured to output the generated first view image. The output unit 130 may be implemented with at least one selected from the group consisting of liquid crystal display (LCD) panels, plasma display panels (PDPs), organic light emitting diodes (OLEDs), vacuum fluorescent displays (VFDs), field emission displays (FEDs), and electro luminescence displays (ELDs).

Referring to FIG. 14, the multiview image display apparatus 100' according to another exemplary embodiment includes a reception unit 110, a controller 120, a parallax unit 150, a display panel 130, and a backlight unit 140.

The reception unit 110, the controller 120, and the display panel (output unit) 130 have been described above and thus description thereof will be omitted. That is, since the controller 120 performs the above-described operation, the multiview image display apparatus 100' generates the multiview image according to the above-described multiview image generating method and displays the generated multiview image in the display panel 130.

The backlight unit 140 may be a general backlight unit which is conventionally applied to LCD panels, or a color sequential backlight unit which is applied to field sequential color (FSC) LCD displays. That is, the kind of the backlight unit 140 may be changed according to the kind of display panel 130.

The parallax unit 150 is disposed at the front of the display panel 130 and disperses light emitted from the display panel 130 according to viewing areas. Therefore, the light corresponding to images having different points of view according to viewing areas is emitted. The parallax unit 150 may be implemented with a parallax barrier or a lenticular lens array. The parallax barrier is implemented with a transparent slit array including a plurality of barrier regions. The transparent slit array blocks light through slits between the barrier regions to emit image light having different points of view according to the viewing areas. A width and pitch of the slit may be differently designed according to the number of view images included in the multiview image and a viewing distance. The lenticular lens array includes a plurality of lens areas. The lens areas are formed to have a size corresponding to at least one pixel column and differently disperse light, which transmits pixels of each pixel column, according to the viewing areas. Each lens area may include a circular lens. Pitches and radii of curvature of lenses may be differently designed according to the number of view images and a viewing distance. The parallax unit 150 is arranged to match a column direction of pixels provided in the display panel 130.

An apparatus for displaying a multiview image through hole area interpolation in the related art performs the operation through a method of simply filling a hole area with a pixel value of an adjacent background in units of horizontal lines or a method of reducing a hole size. In this case, an image of a portion corresponding to a hole area in an actually generated multiview image is often distorted. In particular, when a depth of a neighboring background area is relatively high like a case in which a background around the hole area is an area structurally protruding in the image, the distortion of the image is significant.

However, the multiview image display apparatuses 100 and 100' according to the exemplary embodiments divide the boundary region between the hole area and the background into at least one patch and fills the hole area with corresponding pixels of the most similar portion in the original image to the patch, to solve the problem. In this case, the portion forming the structure in the original image is not simply filled with pixels of adjacent background but filled using the most similar image so that a smooth multiview image can be generated.

Further, when the multiview image display apparatuses 100 and 100' according to the exemplary embodiments generate a multiview image, the multiview image display apparatuses 100 and 100' compare portions of images which are scaled to various ratios with a patch to determine a portion having a higher degree of similarity to a background area of the patch among a plurality of similar portions. That is, a hole image is generated through one original image, a hole area of the hole image is divided into the patches, and the hole area is filled with the image having a high degree of similarity in the original image so that a distortion-free natural multiview image can be generated.

When the multiview image display apparatuses 100 and 100' according to the exemplary embodiments generate a multiview image, if the multiview image display apparatuses 100 and 100' generate an image having a point of view which is exist between two different points of view from images having the two different points of view, the multiview image display apparatuses 100 and 100' generate two hole images and fill a hole area of one hole image with a pixel value of another hole image corresponding to the hole area of the one hole image. Therefore, when the number of individual images is increased, the multiview image display apparatuses 100 and 100' can generate the multiview image rapidly and effectively.

The foregoing exemplary embodiments and advantages are merely exemplary and are not to be construed as limiting the present inventive concept. The exemplary embodiments can be readily applied to other types of devices. Also, the description of the exemplary embodiments is intended to be illustrative, and not to limit the scope of the claims, and many alternatives, modifications, and variations will be apparent to those skilled in the art.

What is claimed is:

1. A multiview image generating method, comprising:
    generating a hole image using depth information of an original image;
    dividing a boundary region in which a hole area of the generated hole image is in contact with a background, into a plurality of patches;
    selecting at least one first patch which is disposed in an area adjacent to the background from among the plurality of patches;
    selecting at least one second patch having a most similar pixel value to a background portion included in the at least one first patch, from an area of the original image; and
    filling the hole area of the at least one first patch with a pixel value which is most similar to a background portion included in the at least one second patch, to generate a first view image.

2. The multiview image generating method as claimed in claim 1, wherein the selecting the at least one second patch comprises:
    scaling the original image to at least two ratios and comparing the at least one first patch included in the scaled original image with the at least one second patch; and
    selecting the at least one second patch having the most similar pixel value to the background portion included in the at least one first patch based on a comparison result.

3. The multiview image generating method as claimed in claim 1, further comprising:

generating a first hole image using the depth information of the original image;

generating a second hole image using depth information of the generated first view image; and generating a second view image by one from among: filling a hole area of the first hole image with a pixel value of an area of the second hole image corresponding to the hole area of the first hole image and filling a hole area of the second hole image with the pixel value of the area of the first hole image corresponding to the hole area of the second hole image.

4. The multiview image generating method as claimed in claim 3, further comprising generating a multiview image by combining pixels of areas of the first view image and the second view image, which correspond to each other.

5. The multiview image generating method as claimed in claim 1, wherein the generating the hole image includes generating the hole image by shifting pixels by distances according to levels of depths of the pixels of the original image.

6. The multiview image generating method as claimed in claim 5, wherein pixels having larger levels of depths are shifted further than pixels having smaller levels of depths.

7. The multiview image generating method as claimed in claim 1, wherein the selecting the at least one first patch comprises selecting a patch having a large difference in pixel values between the hole area and the background portion in the plurality of patches as the at least one first patch.

8. The multiview image generating method as claimed in claim 1, wherein the selecting the at least one second patch comprises determining a degree of similarity by comparing a color, depth, and gradient of the background portion included in the at least one first patch and the at least one second patch.

9. The multiview image generating method as claimed in claim 1, wherein the first view image is generated by repeatedly performing a process from the generating the hole image to the filling a hole area until hole areas of the hole image are completely filled.

10. A multiview image display apparatus, comprising:
a reception unit configured to receive an original image;
a controller which comprises a hole image generator configured to generate a hole image using depth information of the original image, a similar area selector configured to divide a boundary region in which a hole area of the generated hole image is in contact with a background, into a plurality of patches, selecting at least one first patch which is disposed in an area adjacent to the background from among the plurality of patches; and select at least one second patch having a most similar pixel value to a background portion included in the at least one first patch, from an area of the original image, and an image generator configured to fill the hole area of the at least one first patch with a pixel value which is most similar to the background portion included in the at least one second patch, to generate a first view image; and
a display panel configured to output the generated first view image.

11. The multiview image display apparatus as claimed in claim 10, wherein the similar area selector scales the original image to at least two ratios, compares the at least one first patch included in the scaled original image with the at least one second patch, and selects at least one second patch having the most similar pixel value to the background portion included in the at least one first patch based on a comparison result.

12. The multiview image display apparatus as claimed in claim 10, wherein the hole image generator generates a first hole image using the depth information of the original image and further generates a second hole image using depth information of the generated first view image, the image generator generates a second view image by one from among: filling a hole area of the first hole image with a pixel value of an area of the second hole image corresponding to the hole area of the first hole image and filling a hole area of the second hole image with a pixel value of an area of the first hole image corresponding to the hole area of the second hole image.

13. The multiview image display apparatus as claimed in claim 12, wherein the controller further includes a multiview image generator configured to generate a multiview image by combining pixels of areas of the first view image and the second view image, which correspond to each other.

14. The multiview image display apparatus as claimed in claim 10, wherein the hole image generator generates the hole image by shifting pixels by distances according to levels of depths of the pixels of the original image.

15. The multiview image display apparatus as claimed in claim 14, wherein pixels having larger levels of depths are shifted further than pixels having smaller levels of depths.

16. The multiview image display apparatus as claimed in claim 10, wherein the similar area selector performs the selection operation on a patch having a large difference in pixel values between the hole area and the background portion in the divided plurality of patches as the at least one first patch.

17. The multiview image display apparatus as claimed in claim 10, wherein the similar area selector determines a degree of similarity by comparing a color, depth, and gradient of the background portion included in the at least one first patch and the at least one second patch.

18. The multiview image display apparatus as claimed in claim 10, wherein the similar area selector and the image generator generate the first view image by repeatedly performing the selection operation and the filling operation until hole areas of the hole image are completely filled.

* * * * *